United States Patent [19]

Meitner

[11] Patent Number: 5,790,481
[45] Date of Patent: Aug. 4, 1998

[54] RETROFITABLE CD PLAYER SYSTEM

[76] Inventor: Edmund Meitner, 312 Park Ridge Way, SE., Calgary, Alberta, Canada, T2J 4Z6

[21] Appl. No.: 754,764

[22] Filed: Nov. 21, 1996

[51] Int. Cl.[6] .................. H04B 1/20; H04Q 19/02
[52] U.S. Cl. .................. 369/2; 369/6; 340/825.24
[58] Field of Search .................. 369/1, 2, 3, 6, 369/7, 8, 9, 10; 340/825.15, 825.06, 825.24; 455/349, 6.3

[56] References Cited

U.S. PATENT DOCUMENTS

| | | | |
|---|---|---|---|
| 4,864,550 | 9/1989 | Kawanaka | 369/6 |
| 5,235,568 | 8/1993 | Masaru | 369/2 |
| 5,287,333 | 2/1994 | Hirata | 369/4 |
| 5,483,506 | 1/1996 | Yoshioka et al. | 369/7 |
| 5,572,194 | 11/1996 | Shiota | 340/825.25 |

*Primary Examiner*—Tan Dinh
*Attorney, Agent, or Firm*—Paul F. Schenck

[57] ABSTRACT

Installing a high quality audio source, such as a CD player, in an automobil requires often installation of a radio/tuner of sufficient quality to provide an audio signal corresponding to the quality of the audio source. In leased automobils this presents a problem because of warrenty and return conditions. The problem is solved by using a separate amplifier connected into the wiring between factory installed radio/tuner and loudspeakers and sensing the setting of the radio/tuner control knobs by placing a defined modulated carrier on the antenna input of the radio/tuner. The output of the radio/tuner then provides a signal reflecting the setting of the control knobs. This signal is used to control the amplifier.

15 Claims, 2 Drawing Sheets

RETROFITABLE CD PLAYER SYSTEM

BACKGROUND OF THE INVENTION

In many new and older cars in use and in the showrooms the factory installed car radios do not have an input for a high fidelity CD changer or other auxiliary sources of audio information. For installing an auxiliary source for audio information the options, are limited. There are FM interface CD changers, which include an FM modulator and transmitter for a certain channel which then is dialed on the receiver tuner. The result is a sound as good or as bad as the tuner and amplifier of the installed radio.

The installed car radio could be replaced by a radio that has an interface for an auxiliary audio source. However, such a solution is not always applicable due to warranty and other reasons. One could also add another preamplifier/amplifier in addition to the installed system. The condition is that the driver must be able to safely operate the controls. This option is not always available for all cars.

The present invention provides for an option which requires minimum changes to the installed audio system which in turn can be reversed when removing the CD changer (auxiliary audio source). This is of importance for factory installed audio systems with warranty, and for many leased cars. Furthermore, the present invention does not change any of the existing audio controls nor does it add additional controls, except for adding the essential controls for the added auxiliary audio source. In case of a CD changer the additional controls would include an activating ON/OFF switch and selection controls for disc and track.

It is considered to be within the skills of the artisan in this field to apply the principles of the present invention to other audio information sources.

SHORT DESCRIPTION OF THE INVENTION

The present invention relates to aftermarket installation of additional audio information sources in automobiles where high quality of audio reproduction is desired, and where the changes to the installed system have to be kept at a minimum. The present invention fulfills this task in a surprisingly simple manner and does not require that the driver has to adapt to a new way or method of controlling the expanded audio system. In an audio system of the present invention the installed loudspeaker wires are disconnected from the loudspeakers and connected to the added components of the present invention. The car antenna is disconnected from the antenna of the installed car radio and is also connected to one of the added components. A new cable is added to connect the antenna input of the installed car radio to the antenna output of the added components. The controls of the installed radio remain fully functional, whether a regular radio function is performed or whether the installed auxiliary audio source is selected. Regular radio functions include all the functions made available by the installed audio system.

The aftermarket audio system of the present invention includes a special preamplifier, amplifiers for the various loudspeakers, the auxiliary audio source with its controls and an electronic switch at the antenna input of the installed radio receiver. If the auxiliary audio source is activated it outputs its audio signal to the preamplifier of the present invention, which includes all the means required for high quality reproduction. Separate amplifiers are provided for the extra power required for high quality audio reproduction.

Depending upon the selection of the audio source the antenna input of the installed radio is either connected to the car antenna for regular operation, or it receives a special signal from the pre-amplifier if the added auxiliary audio source is selected. In the later case a special signal supplied by the pre-amplifier is passed on to the antenna input of the installed car radio. This special signal is treated in the car radio as any other received radio signal. As a result the car radio provides signals on the loudspeaker outputs which are indicative for the setting of the control knobs for loudness, balance, fade and tone. This signal is returned to the preamplifier via the loudspeaker cables, where it is analyzed to determine the selections made by the operator regarding loudness, balance, fade and tone. The result of the analysis is then applied to the audio signal supplied by the auxiliary audio source. Thus, the control knobs of the factory installed car radio remain fully functional. If the car radio is selected as audio source, the output signals on the loudspeaker outputs of the car radio, the demodulated signal of the selected radio station, is passed through the pre-amplifiers to the loudspeakers.

SHORT DESCRIPTION OF THE FIGURES

OBJECTS OF THE INVENTION

It is an object of the invention to provide for a high quality audio system which can be installed under aftermarket condition without making irreversible changes to the factory installed radio system.

It is another object of the invention to provide for a high quality audio system using the controls of the factory installed equipment for controlling aftermarket installed audio system components.

It is still another object of the invention to provide for a high quality audio system independent of the audio reproduction quality of the factory installed radio/tuner/amplifier.

It is still another object of the invention to provide for a high quality audio system which can be de-installed from a car without requiring re-installation of factory installed components.

DETAILED DESCRIPTION OF THE INVENTION

As indicated above, the system of the present invention allows to attach high quality audio components to a factory installed car radio system. A CD changer is used as an exemplatory device. However, other types of audio sources, such as tapes etc. can be used in combination with the system of the present invention, too.

Figure 1:
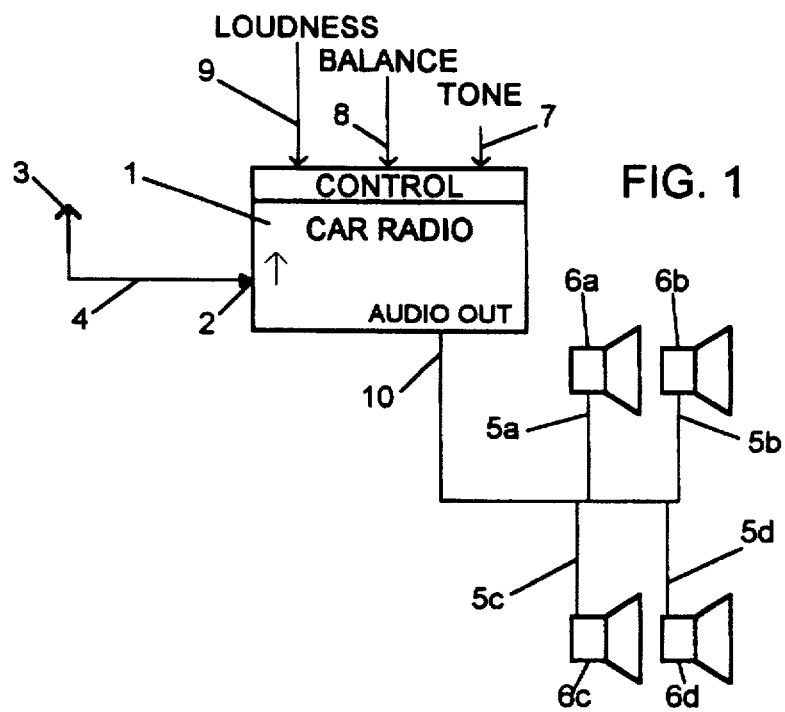
FIG. 1 is a schematic block diagram of a factory installed car radio.

FIG. 1 is a schematic block diagram of a factory installed car radio system. Such an audio system includes an antenna 3, a cable 4 between antenna 3 and the antenna input 2 of car radio 1. Loudspeakers 6a–6d are connected by loudspeaker cables 5a–5d either directly or via separate loudspeaker amplifiers (not shown in FIG. 1) to the loudspeaker outputs 10 of car radio 1.

Figure 2:
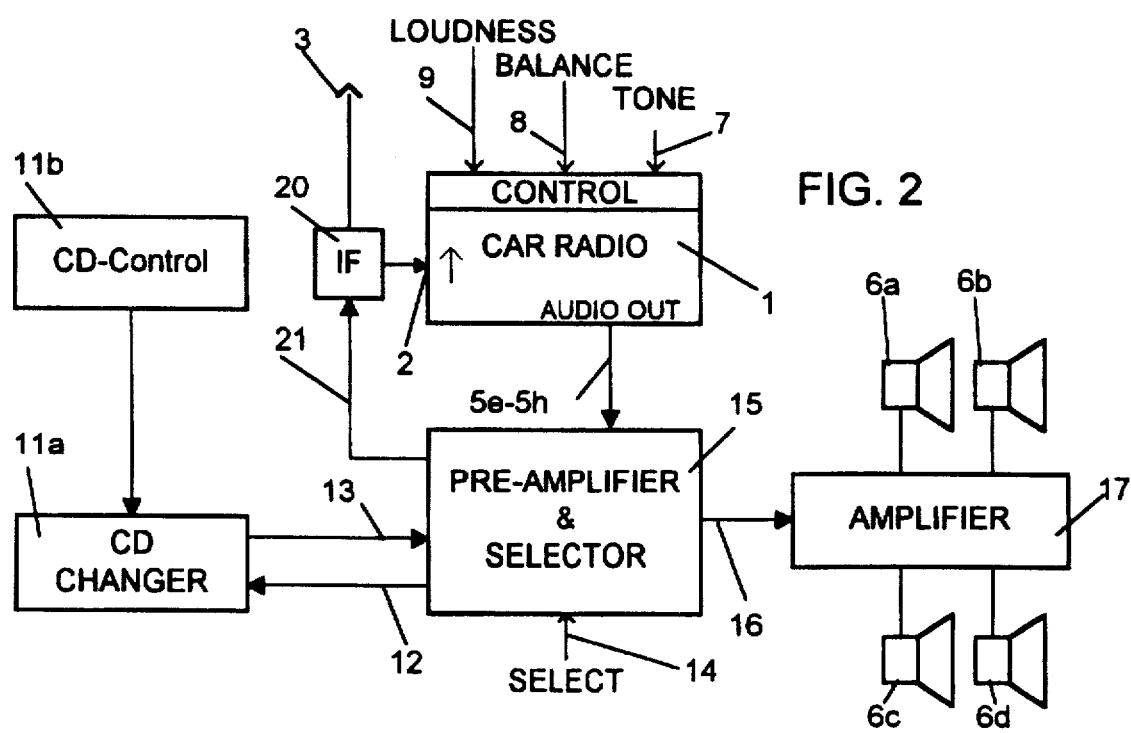
FIG. 2 is a schematic block diagram of an installation of a factory installed car radio in combination with an aftermarket audio system of the present invention.

FIG. 2 is a schematic block diagram of an installation of a factory installed car radio in combination with an aftermarket system of the present invention. Besides the installed components shown in FIG. 1 an audio system including the present invention includes auxiliary audio source 11a with its controls 11b, a preamplifier 15 and high quality loudspeaker amplifier 17. Preamplifier 15 receives audio signals from auxiliary audio source 11a on line 13, and it receives audio output signals from the installed car radio 1 via loudspeaker cables 5e–5h. An antenna interface module 20 connects either antenna 3 or a special signal provided by pre-amplifier 15 on line 21 to the antenna input 2 of car radio 1. When activating auxiliary audio source 11a via its control 11b antenna interface module 20 selects the signal on line 21 from pre-amplifier 15 to be inputted to antenna input 2 of car radio 1. In one configuration the selection is controlled by monitoring the power consumption of auxiliary audio source 11a, which receives its power via line 12 from pre-amplifier 15. Thus, if audio source 11a is turned on by a switch included in control panel 11b, then pre-amplifier 15 will send the special signal on line 21 to antenna interface module 20. Antenna interface module 20 will transfer this special signal onto antenna input 2 of car radio 1.

Under either operating conditions, independent on the position of the selection of the audio source, the car radio controls for loudness 9, balance 8, fade (if available) and tone 7 remain fully effective. A tone control 7 may consist of bass an treble controls or even an equalizer. The operation of the controls is unchanged when the installed car radio is the audio source. The antenna signal is forwarded via antenna interface module 20 to antenna input 2 of car radio 2. However, if the high quality audio source is activated, then the preamplifier transmits the special signal, an FM modulated carrier signal to antenna input 2 of car radio 1. Upon tuning car radio 1 to this frequency the controls of the car radio will determine what is returned via the loudspeaker cables to pre-amplifier 15. An analyzer in preamplifier 15 determines the deviations of the signals on the installed loudspeaker wires 5e–5h from the expected signal and sets the pre-amplification of the audio source signal on line 13 accordingly. The analysis includes loudness on each of the loudspeaker wires, which determines loudness, balance and fade, and it includes a frequency analysis to set equalization of the audio signal supplied by high quality audio source 11a as set by the user at the equalizer or treble and bass controls of the installed radio 1. This method functions even in combination with controls of an installed car radio with lower audio specifications than the aftermarket installed audio equipment.

The special signal provided by pre-amplifier 15 for input to antenna input 2 of car radio 1 is a white noise signal with a fixed frequency pilot tone modulated on a certain carrier frequency. For proper operation radio 1 is to be tuned to this carrier frequency for demodulation and recapture of the modulation signal, white noise signal and the pilot tone. The modulation signal is then changed according to the setting of loudness control 9, balance control 8 and tone control 7 and output on original loudspeaker wires 5e–5h.

The selection of the audio source is controlled via the selection switch of the high quality audio component. If this component is turned on then the pre-amplifier generated the special signal for input to the antenna input of the car radio. The pre-amplifier is switched to controlling the output signal of the high quality audio component. If the high quality audio component is not selected, then the pre-amplifier lets the output signal of the car radio pass through to the loudspeaker amplifiers. Actual control of the mode of operation of the pre-amplifier can be made dependent upon the power consumption of the high quality audio component. If the high quality audio component is not selected or is not operative as indicated by a low or zero power consumption, the pre-amplifier is in stand-by mode and the audio signal from the car radio are passed on to the loudspeakers. If the high quality audio source is selected and its power consumption is increased, the pre-amplifier switches to its second mode controlling the output signal of the high quality audio source as disclosed above.

Figure 3:
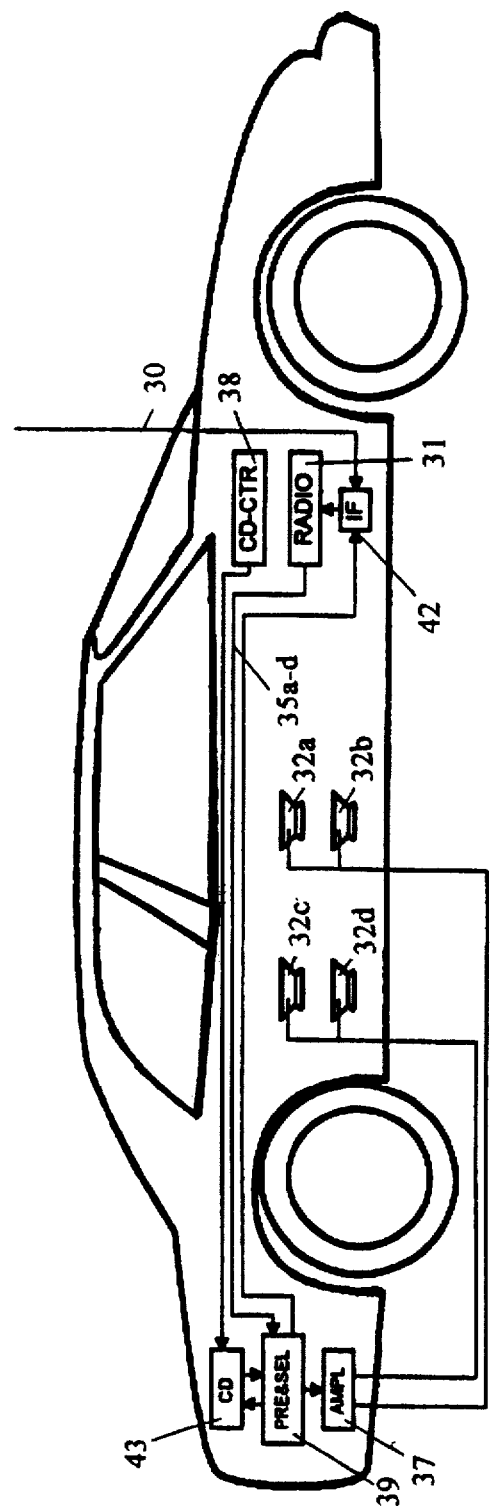
FIG. 3 is a schematic illustration of a car with a factory installed car radio and an aftermarket audio system of the present invention.

FIG. 3 is schematic illustration of an automobile including an after-market audio system of the present invention. Antenna 30, radio 31, loudspeakers 32a–32d and wires 35a–35d are factory installed. Wires 35a–35d connect the audio outputs of radio 31 with pre-amplifier and selector 36. When selecting audio source 43 wires 35a–35d each carry the special signal consisting of a white noise signal and a pilot tone for determining the settings of the controls on radio 31 for loudness, balance, fade and tone. These wire originally were connected to loudspeakers 32a–32d. However, in the upgrade of the audio system loudspeakers 32a–32d are connected to amplifier 37. Interface module 42 selects either the signal provide by antenna 30, or the special signal provided by pre-amplifier and selector 39 forwarded to the antenna input of radio 31. Thus the installation of high quality audio source 43, in FIG. 3 a CD player, requires only a few additions to the factory installed wiring, makes use of the existing controls and can be removed by reconnecting corresponding wires.

The processing of the signals provided at the loudspeaker outputs of the car radio and forwarded to the pre-amplifier during reproduction of the audio signal from the auxiliary audio source may include software controlled data processing means such as digital signal processors and Fast-Fourier-Transform (FFT) processes. These processing means and processes analyze the signals provided at the car radio on its loudspeaker outputs to determine the setting of the controls for loudness, balance, fade and tone. The first three settings compare the differences between the signal at the individual loudspeaker outputs of the car radio. The setting of the tone by either a single knob tone control or by an equalizer is recognized by analysis of the returned white noise signal. It is within the skills of the artisan to implement such processing means and processes in the most cost effective way using commonly available components or custom designed elements.

It is understood to be within the scope of the invention to apply the above disclosed principles of the present invention to installed audio systems having loudspeaker amplifiers installed, and to include other audio equipment such as telephone and special communication facilities in the system. Furthermore, it is possible to substitute the white noise signal with a signal having a defined frequency spectrum and frequency/time characteristic.

What I claim is:

1. A high quality audio source for use in combination with an existing car radio installation, comprising
   a radio/tuner having a first antenna input, and providing first audio signals on a set of first audio signal outputs,
   a high quality audio source providing second audio signals on a set of second audio signal outputs,
   said radio/tuner further including means for selectively controlling said first or second audio signals,
   an antenna for receiving wireless transmitted signals,
   a preamplifier,
   a set of loudspeaker amplifiers, each having an input and an output,
   a plurality of loudspeakers each having a fourth audio signal input;

said pre-amplifier having
- an modulated signal output connected to said first antenna input,
- a set of first audio signal inputs connected to said first audio signal outputs of said radio/tuner,
- a set of second audio signal inputs connected to said second audio signal outputs of said high quality audio source,
- a third set of audio signal outputs, each of said third set of audio signal outputs being connected to one of said fourth audio signal inputs of said plurality of loudspeakers via an associated one of said loudspeaker amplifiers.

2. A high quality audio source for use in combination with an existing car radio installations as claimed in claim 1, wherein said pre-amplifier provides a modulated carrier signal on said modulated signal output, and wherein said radio/tuner when tuned to said carrier frequency provides at said set of first audio signal outputs said first audio signals indicative of said setting of said means for selectively controlling said first or second audio signals.

3. A high quality audio source for use in combination with an existing car radio installations as claimed in claim 2, wherein said means for selectively controlling said first or second audio signals include control means for setting at least loudness, balance and tone.

4. A high quality audio source for use in combination with an existing car radio installations as claimed in claim 3, wherein said control means for setting tone include an equalizer.

5. A high quality audio source for use in combination with an existing car radio installations as claimed in claim 2, wherein said modulated carrier signal includes a white noise signal.

6. A high quality audio source for use in combination with an existing car radio installations as claimed in claim 2, wherein said modulated carrier signal includes a fixed frequency pilot tone.

7. A high quality audio source for use in combination with an existing car radio installations as claimed in claim 5, wherein said white noise signal is used to determine the setting of said control means for setting tone.

8. A high quality audio source for use in combination with an existing car radio installations as claimed in claim 6, wherein said fixed frequency pilot tone is used to determine the setting of said control means for setting loudness and balance.

9. A high quality audio source for use in combination with an existing car radio installations as claimed in claim 6, wherein said fixed frequency pilot tone is used to determine the setting of said control means for setting loudness, balance and fade.

10. A high quality audio source for use in combination with an existing car radio installations as claimed in claim 2, wherein said pre-amplifier receives said audio signals indicative of said setting of said means for selectively controlling said first or second audio signals, and
wherein said pre-amplifier includes means for analyzing said audio signal and at least means for controlling loudness, balance and tone of said third set of audio signals.

11. A high quality audio source for use in combination with an existing car radio installations as claimed in claim 10, wherein said means for analyzing includes means for performing a fast-fourier transform operation and providing control signals indicative for the setting of said control means for loudness, balance and tone of said radio/tuner.

12. A high quality audio source for use in combination with an existing car radio installations as claimed in claim 10, wherein said means for analyzing includes means for performing a fast-fourier transform operation and providing control signals indicative for the setting of said control means for loudness, balance, tone and fade of said radio/tuner.

13. A method for controlling loudness, balance and tone of an audio signal of a not-factory installed audio source in an automobile using control means for loudness, balance and tone of a factory installed car radio, said method including
- providing a broadcast frequency carrier modulated with a first signal to said car radio,
- tuning said radio to said broadcast frequency,
- recovering said first signal from said broadcast frequency carrier, thereby providing a second signal,
- a first process for changing said second signal in accordance with the setting of said control means, thereby providing a third signal, and
- a second process for generating signals for controlling loudness, balance and tone of said audio signal provided by said not-factory installed audio source, using said third signal.

14. A method for controlling loudness, balance and tone of a not-factory installed audio source in an automobile using control means for loudness, balance and tone of a factory installed car radio, as claimed in claim 13, said method further including using said third signal to control loudness, balance, tone and fade of said audio signal provided by said not-factory installed audio source.

15. A method for controlling loudness, balance and tone of an audio signal of a not-factory installed audio source in an automobile using control means for loudness, balance and tone of a factory installed car radio, as claimed in claim 13, wherein said process for generating a signal includes applying a fast-fourier transform operation on said second signal.

* * * * *